July 8, 1941.  R. A. FISCHER  2,248,618
BACTERICIDAL APPARATUS
Filed April 1, 1939
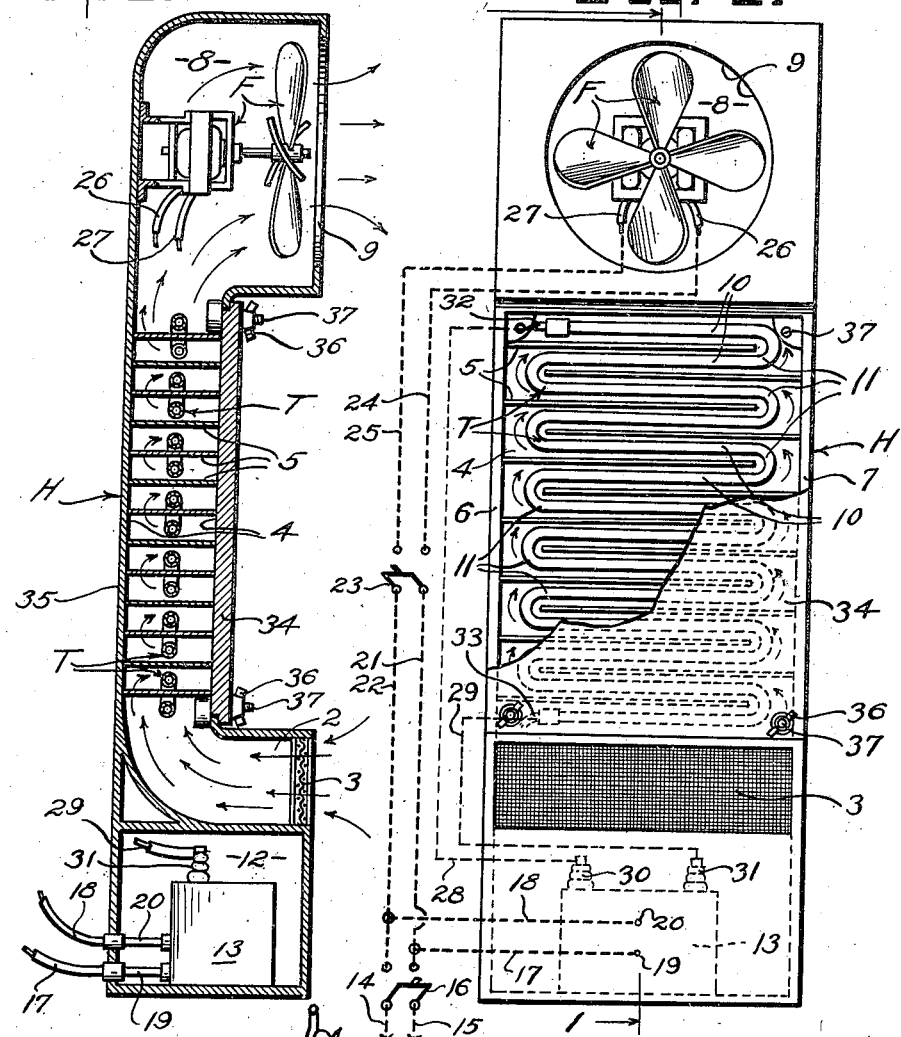
Inventor
ROBERT A. FISCHER
by *L. Arthur L. Mack*
Attorney.

Patented July 8, 1941

2,248,618

UNITED STATES PATENT OFFICE 2,248,618

BACTERICIDAL APPARATUS

Robert A. Fischer, Glendale, Calif.

Application April 1, 1939, Serial No. 265,559

2 Claims. (Cl. 250—52)

This invention relates to and has for an object the provision of an irradiating unit adapted for installation in a room or enclosure and comprehends the use of ultra-violet or other light rays of short wave length which are bactericidal in effect for the purpose of substantially reducing, if not quite completely eliminating, bacteria from such a room or enclosure by continuous or intermittent use of the unit.

A satisfactory unit for the purpose mentioned may include a housing closed to the atmosphere except for an air inlet and an air outlet between which is an irradiating element in the form of a tube of light transmitting material, such as quartz, suitably arranged and connected with a source of electricity so as to radiate light of short wave length within a restricted air passage, and means, such as an electric fan, or natural means, for inducing circulation of air through said passage and thereby subjecting the circulating air to the bactericidal effect of the rays of light emitted from said element.

In consideration of this invention, it may be understood that though the unit is designed primarily for the purpose of destroying bacteria present in the air, the unit is also capable of use for various other purposes, such as for instance, the provision of one or more of the units in a refrigerator or compartment in which food is stored, and the arrangement of the units in such positions that the emitted rays of light will be directed for necessarily limited periods of time against meats and other perishable foods for destroying bacteria resident thereon or for destroying bacteria present in the air in such enclosures.

Other uses and objects will appear as the description of my invention progresses, reference being had to the accompanying drawing showing a preferred embodiment of the invention, subject to modification, within the scope of the appended claims.

In said drawing:

Figure 1 is a sectional elevation of one form of my invention arranged as a unit as seen on line 1—1 of Figure 2;

Figure 2 is a front elevation of the same with the cover partly broken away to show the internal arrangement of the unit, and including an electric wiring diagram by means of which the electrical elements of the unit are connected for use;

Figure 3 is a perspective view of a battery of units arranged, as in a refrigerator or enclosure, for the bactericidal treatment of meats and other foods; and Figure 4 is a diagram, in plan, of a refrigerator or food compartment with the units arranged as in Figure 3.

As preferably arranged each unit includes a housing H for enclosing all of the elements of a unit and adapted to be preferably supported in vertical position on a wall or other supporting structure (not shown). Said housing has an inlet passage or compartment 2 near its bottom which may be covered by a fine screen 3 at its opening to the atmosphere for preventing entrance of foreign matter to said passage.

Above the inlet 2 a restricted passage 4 is provided in said housing and may have suitably mounted therein a series of partitions or baffles 5 which alternately extend from one of the sides 6 or 7 in the direction of, but stop short of, the other of said sides so as to provide a circuitous passage 4 formed of a plurality of sections between adjacent baffles, as shown in Figure 2, the lowermost section of passage 4 in the form of unit shown being in communication with inlet 2 and the uppermost section in communication with an outlet compartment 8 above passage 4. Passage 4, may, under certain conditions, be straight or of a form other than shown herein.

Said outlet passage 8 has an outlet 9 which is open to the atmosphere and serves, if necessary, to enclose an electric fan F by means of which a flow of air is induced through inlet 2 and passage 4 into and outwardly from compartment 8 through outlet 9 to the atmosphere. A light emitting tube T is arranged in passage 4 and is formed to correspond to the character of said tube, but as shown has a section 10 horizontally disposed in each of the sections of passage 4, as shown in Figure 2, and bends 11 connect the horizontal sections 10 of the tube so that the tube may be continuous from end to end thereof.

It will be noted that the spaces between the baffles 5 are narrow enough that air circulating through passage 4 will be somewhat, or to a sufficient extent, restricted in cross sectional area and volume in order that the effect of light emitted from tube T will have a maximum of bactericidal effect on air induced through said passage.

Preferably, at the bottom of housing H, I provide a compartment 12 in which a suitable transformer 13 is mounted for stepping the electric current from a normal voltage to approximately 12,000 volts pressure, thereby providing for tube T a current of approximately 30 milliamperes and assuring a degree of efficiency approximately 85% of the bactericidal rays, and emit light from said tube of a wave length of 2537 Ångstrom units. The above named computations are based on a given size of tube T and certain other conditions, and are subject to variations more or less as conditions are changed.

The electrical connections, as shown in Figure 2, are simple and few in number and include conductors 14 and 15 leading from a source of current to a main switch 16 and thence from said switch by means of wires 17 and 18, respectively, to terminals 19 and 20 of transformer 13 and by means of wires 21 and 22 from switch 16 to a switch 23. Wires 24 and 25 connect the terminals of switch 23 with terminals 26 and 27 of fan F. Transformer 13 is connected by means of wires 28 and 29, respectively, at its terminals 30 and 31 with terminals 32 and 33 at the upper and lower ends of tube T. Thus, the fan F may be disconnected from the line circuit when switch 16 is closed by opening switch 23, as in the case of using the unit for direct irradiation of foods, etc., as shown in Figures 3 and 4. When switches 16 and 23 are both closed, however, current is simultaneously supplied to fan F and tube T—in the latter case, through the transformer 13.

Housing H has a detachable front cover 34 which is suitably spaced from the back 35 and may be held in closing position as by means of wing nuts 36, threaded onto bolts 37, suitably affixed to the frame of said housing. Thus, the units may be adapted for use in the direct irradiation of food products, as shown in Figures 3 and 4, by directing bactericidal rays of suitable wave length upon articles of food when the cover is removed from the housing H. In such case, it will be apparent that the fan F will be de-energized by opening switch 23. Removal of cover 34 also affords ready access to tube T at any time.

In operation, the unit, or units in sufficient number, are supported in position for use on a wall or other supporting structure with inlets 2 at a low elevation in a room or enclosure so that the operation of fan F, or by operation of natural laws, will induce a continuous thin stream of air through said inlet and thence upwardly through the lighted passage 4 and into and thence from outlet compartment 8, the path of the air stream being circuitous as determined by the character and number of the baffles 5 or otherwise as the case may be. Thus, bacteria resident in the air is destroyed. The air treating operation may be continuous or intermittent as occasion and conditions may require.

The irradiating tube T may or may not be of conventional form, or of special form and character, and of any material which will transmit light of short wave length within the bactericidal range, and the components of gas, mercury, and other elements within the tube T are such as will produce rays of desired character. In the course of my experimentation, I have ascertained that suitable rays of light within the hereinabove named range of bactericidal efficiency are most effective for affording satisfactory results in a tube of approximately 12 mm. diameter but reasonable latitude and variation from said established and proven computations may be required under certain conditions of operations and use, and by varying the size and character of the tube T.

The air in a room or enclosure may be very quickly treated, even by a single unit, so as to destroy bacteria present in the air, hence it is not necessary at all times to maintain the apparatus in continuous operation. When used in a refrigerator, it is effective for destroying bacteria in the air or on food products only to treat the air, either with or without the fan F as the difference in temperatures at the top and bottom of the enclosure, especially when the enclosure is vented, is sufficient to cause circulation of air through passage 4.

The speed and capacity of fan F is preferably low and the baffles are designed so that the flow of air will be as slow as possible to insure a maximum of bactericidal effect.

What I claim as new is:

1. A bactericidal apparatus comprising: a housing closed to the atmosphere except for an air inlet and an outlet, and a baffled passage intermediate said inlet and outlet of restricted area, a tubular and continuous irradiating element supported in and extending throughout said passage, means connecting said element with a source of electric current for energizing said element, and air induction means adjacent said outlet, for effecting circulation of air through said passage for irradiation, and a detachable cover over said passage and removable from said housing at will, whereby articles contaminated with bacteria may be directly irradiated for treatment of bacteria thereon.

2. A bactericidal apparatus comprising: a housing closed to the atmosphere except for an air inlet and an outlet, an air chamber being formed therein adjacent said inlet and an air exhaust chamber adjacent said outlet, an intermediate air flow chamber communicating at opposite extremities with said air inlet and exhaust chambers, a plurality of baffles alternately extended from opposite sides of the air flow chamber in the direction of the remote sides, respectively, but having remote extremities spaced from the adjacent sides of the chamber so as to provide air passages alternately at the ends of the baffles, an electrically energizable continuous irradiating tube with parallel sections disposed in the air spaces between said baffles and connecting bends extending through the openings at the ends of said baffles so as to continuously treat the air as it flows through the circuitous passage formed by said baffles, means for electrically energizing said tube, and means in said air exhaust chamber for inducing a flow of air through said irradiating passage and said outlet.

ROBERT A. FISCHER.